United States Patent
Magnan

[11] 3,790,394
[45] Feb. 5, 1974

[54] CONCRETES AND REINFORCED CONCRETES WITH A LOW EXPANSION COEFFICIENT

[75] Inventor: Regis Magnan, Montelimar, France

[73] Assignee: S. A. Ciments LaFarge, Paris, France

[22] Filed: Jan. 4, 1971

[21] Appl. No.: 103,775

[30] Foreign Application Priority Data
Jan. 7, 1970 France .............................. 70.00341

[52] U.S. Cl. .................................. 106/97, 106/104
[51] Int. Cl. ............................................. C04b 7/02
[58] Field of Search ......................... 106/89, 97, 104

[56] References Cited
OTHER PUBLICATIONS
Berry and Masen, "Minerology," W. H. Freeman & Co., pgs. 539–540 (1959).
Lea and Desch, "The Chemistry of Cement and Concrete," Edw. Arnold & Sons, pgs. 459–460, 483–487, 493, 499–500 (1956).

*Primary Examiner*—James E. Poer

[57] ABSTRACT

Concrete is known to have a significant heat expansion coefficient, of about $12.10^{-6}$ m/m/°C, which has to be considered in designing structures and which can also affect the cost of such structures considerably.

The present invention relates in particular to concrete and self-prestressed reinforced concrete with a low expansion coefficient and density.

The concrete and reinforced concrete products are suitable for all purposes involving highway construction, large slabs, etc., for the nuclear power industry. Such products can also be used in producing strong and light-weight units that can withstand heat.

12 Claims, 1 Drawing Figure

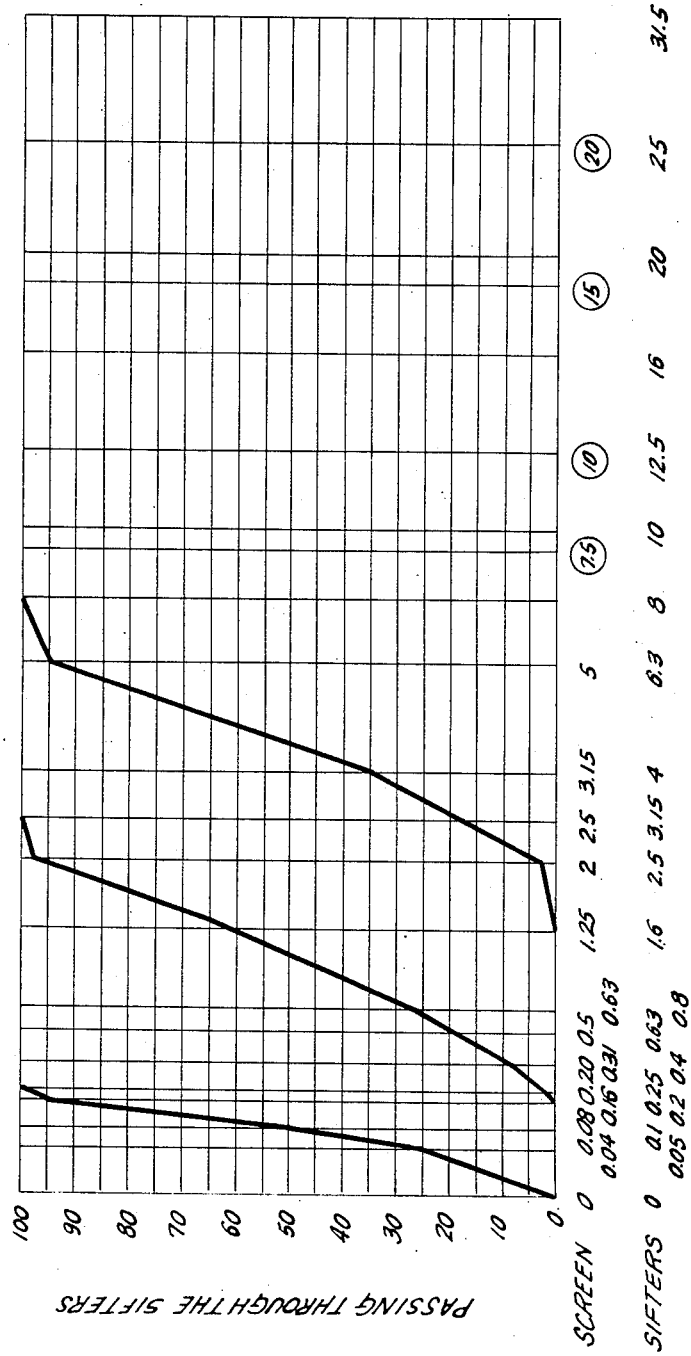

ced concrete. The invention also relates to the con-
CONCRETES AND REINFORCED CONCRETES WITH A LOW EXPANSION COEFFICIENT The present invention relates to a new process for preparing concrete with a low expansion coefficient, and to a process for preparing self-prestressed reinforced concrete. The invention also relates to the concretes and reinforced concretes obtained by such a process.

Since the concrete products obtained by the present invention are characterized by a low expansion coefficient, such products are extremely useful in the building and public works areas.

Concrete is known to have a significant heat expansion coefficient under normal conditions of use, of around $12 \cdot 10^{-6}$ m/m/°C, and this characteristic must be considered in designing structures. It can also affect the cost of such structures considerably, since it depends directly on the quality of the aggregates used in making the concrete, and in particular on their expansion coefficients. The aim has therefore been to find natural or artifical solids with very low expansion coefficients.

Among natural minerals, particular attention was drawn to cordierite, with the formula $2MgO, 2Al_2O_3, 5SiO_2$, which has an extremely low expansion coefficient, i.e., about $0.53 \cdot 10^{-6}$ F. Singer and Cohn (Ber. Deutsch. Ker. Ges. 10, p. 269 1929-), reported that cordierite can be produced synthetically using a purely ceramic method by mixing a number of minerals such as talc, plastic clay and alumina, in the proportions required for the composition of cordierite. Other minerals, such as serpentine, magnesite and kaolin, can also be used. According to F. Singer and Cohn, the mixtures thus obtained are formed by pressing, then baked at 1,410°C.

The present invention relates to a process for preparing concretes with a low expansion coefficient, in which cordierite or expanded cordierite aggregates, which may br partly crushed, are mixed in such a way as to present the desired grain-size range; a binder is then added, possibly after the adding of a proportion of fines.

According to one embodiment of the process involved in the present invention, these aggregates are obtained from an unbaked mixture formed from substances in the proper proportions required to obtain cordierite; these are crushed, possibly in the presence of an expansion agent, and then formed into granules of suitable size and shape, which are then sintered at a temperature between 1,200° and 1,450°C, and preferably at around 1,350° to 1,390°C.

According to another embodiment of the process involved in the present invention, granules of suitable size and shape are obtained by any known method, such as granulation or different extrusion processes.

According to yet another embodiment of the process involved in the present invention, the raw materials required to produce the cordierite are, preferably, selected from substances such as kaolin, magnesite, alumina, bauxite, serpentine, talc and clay.

According to yet another embodiment of the process involved in the present invention, the expansion agent is added to the unbaked mixture in proportions ranging from 3 to 5 percent in weight.

According to another embodiment of the process involved in the present invention, the expansion agent is a sulphate such as Ca, Mg, Na, Al, or Fe sulphates, or carbonate such as Li, Ca, Sr or Ba carbonates, or even an organic substance such as fuel-oil.

According to another embodiment of the process involved in the present invention, the expansion agent is anhydrous or hydrous calcium sulphate.

According to another embodiment of the process involved in the present invention, the aggregates may consist wholly or in part of cordierite, for instance 30 to 50 percent in weight of cordierite granules of more than 5 mm in size; the proportion of fines may be sand, cordierite or any other material that can form an aggregate.

According to yet another embodiment of the process involved in the present invention, the binder may be any suitable binder such as hydraulic, chemical, ceramic or polymer-based binder.

The present invention also relates to the concrete thus obtained, with a low expansion coefficient, the aggregate content of which consists wholly or in part of cordierite, and relates in particular to concrete with a density of less than 2.1.

The concrete involved in the present invention can be used to make objects that have to withstand thermal impacts and cycles, such as slabs and superstructures for tip-trucks in tunnel furnaces for the tile and brick industry, heating covers, rotary cement-plant furnaces, blast-furnace mouths, saggers for the ceramic industry.

The present invention also relates to refractory substances obtained from concrete consisting of cordierite and a chemical binder (phosphates or sulphates), ceramic binder (stoneware clay with high magnesium content), or polymer-based binder (aluminium hydroxychlorides or polyphosphates).

The present invention also relates to a process for preparing self-prestressed concrete, in which reinforced concrete is hydrated at a fairly high temperature, of around 80°C, for example and then cooled slowly.

According to another embodiment of the said process for preparing self-prestressed concrete, reinforced concrete is hydrated at a temperature roughly equivalent to room temperature, and then cooled by contact with products such as liquefied gas, at the temperature of such gas.

The present invention also relates to the reinforced concrete and self-pre-stressed reinforced concrete, and in particular the tri-axial self-prestressed reinforced concrete obtained by means of the preparation process involved in the present invention.

The present invention also relates to any tank, and particularly any liquefied gas-storage tanks, made from the said concrete.

Concretes and reinforced concretes according to the present invention are particularly useful because of their low expansion coefficient and low density, especially for civil engineering purposes (motorway construction, large slabs without expansion joints) and the nuclear power industry.

Other aims and advantages of the present invention will be apparent from reading the examples below, which are non-restrictive, and which represent various embodiments of the invention.

EXAMPLE 1

Cordierite, with the formula $2MgO, 2Al_2O_3, 5SiO_2$, is prepared from kaolin, sintered magnesite and china-clay sand, an analysis of which is given in table 1 below.

TABLE 1

| Materials used | $SiO_2$ | $TiO_2$ | $Al_2O_3$ | $Fe_2O_3$ | CaO | MgO | $H_2O$ | Kg per t cordisprite |
|---|---|---|---|---|---|---|---|---|
| Kaolin | 50.9 | 0.45 | 34.5 | 0.36 | 1 | 0.25 | 10.8 | 1,010 |
| Sintered magnesite | 1.5 | — | 0.35 | 0.5 | 2.75 | 94.3 | 0.1 | 145 |
| China-clay sand | 79 | — | 19 | — | — | — | — | 5 |

This mixture is first granulated in a plate-type tilted rotating granulator, to which approximately 15 percent water is added. The unbaked granules, the diameters of which range from 5 to 25 mm, are then dried and baked to between 1,350 and 1,370°C, being held at this temperature for 15 minutes.

The only impurities revealed by an X-ray examination are traces of mullite. The expansion coefficient between 0° and 90°C, measured on a sintered test-piece, is approximately $0.5 \cdot 10^{-6}$.

For comparative testing purposes, cordierite aggregates were prepared from the necessary quantities of talc and serpentine, corrected with bauxite. The properties of aggregates obtained using impure natural materials are slightly modified because of the impurities present, such as FeO replacing MgO or $Fe_2O_3$. However, as long as the actual and theoretical compositions of the cordierite are not too different, the qualities of the product remain acceptable.

EXAMPLE 2

Expanded cordierite can be obtained during baking, using the same materials as above, but with the addition of 3 to 5 percent $SO_4Ca$. Baking is done at 1,400°C. For expansion to take place normally, the temperature must rise rapidly. This means that there is a considerable temperature-lag between the core of the granule and its surface. The gas produced in the granule core cannot escape because of the viscosity of the surface.

When expansion has occurred, the material has to be cooled quickly, to prevent the gas emitted from escaping from the granules. The temperature should therefore be held for only a short period at the end of baking.

In the present example, the gas-generating element is $SO_4Ca$, which decomposes at around 1,000°C into $SO_3$, which probably in turn breaks down into $SO_2$ and $O_2$.

The expanded substance obtained in cordierite, as is shown by the X-ray diffraction spectrum; the lime resulting from the decomposition of the $SO_4Ca$ forms part of the solid solution.

The specific weight is much less than 2, generally between 0.6 and 2.

This is a particularly valuable application, since the product can be used for lightweight objects that can withstand heat shocks.

EXAMPLE 3

Concrete is prepared from cordierite aggregates, in the proportions shown in table 2, obtained using the method involved in the invention. The concrete has the following properties:
density when placed  2.106
compressive strength after 7 days on cubes of 14  18370 bars
tensile strength in splitting test after 7 days  25 bars
expansion coefficient between 0° and 90°C. $3.6 \cdot 10^{-6}$ m/m/°C.

TABLE 2

| | Grain-size (mm) | Kg |
|---|---|---|
| Cordierite | 16 – 20 | 231 |
| | 12.5 – 16 | 336 |
| | 10 – 12.5 | 240 |
| | 8 – 10 | 144 |
| | 5 – 8 | 55 |
| | 0 – 5 | 593 |
| CPA 325 | | 350 |
| Water | | 155 lt. |

EXAMPLE 4

A mixed concrete is prepared from cordierite aggregates with a grain-size of more than 5 mm obtained in Example 1 (the expansion coefficient of the concrete depends mainly on the coefficient of the coarsest aggregates from which it is produced), and a proportion of fines, with a grain-size of less than 5 mm, consisting of Seine sand, in the proportions shown in table 3 below.

TABLE 3

| | Grain-size (mm) | Kg |
|---|---|---|
| Cordierite 333 | 16 – 20 | 227 |
| | 12.5 – 16 | |
| | 10 – 12.5 | 236 |
| | 8 – 10 | 142 |
| | 5 – 8 | 55 |
| Seine sand | 0 – 5 | 683 |
| CPA 325 | | 350 |
| Water | | 146 lt. |

This concrete has the following properties:
density when placed  2.172
Compressive strength after 7 days on cubes of 14  18420 bars
tensile strength in splitting test after 7 days  20 bars
expansion coefficient between 0° and 90°C  $185.9 \cdot 10^{-6}$ m/m/°C.

EXAMPLE 5

Refractory concrete is produced from cordierite granules according to Example 1, mainly spherical, crushed, to produce a Fuller curve of 0 – 5 mm (FIG. 1), curves 0 – 0.2, 0.2 – 2, 2 – 5.

The composition in weight, with an aluminous cement basis, is as follows:

|  | Grain-size | Kg |
|---|---|---|
| Granulate | 2 – 5 | 540 |
|  | 0.2 – 2 | 595 |
|  | 0 – 0.2 | 280 |
| Aluminous cement |  | 500 |
| Water |  | 270 lt. |

The dilatometric curve shows very slight variations: 0.5 percent swelling at 1,200°C and 0.25 percent final shrinkage. This dimensional stability is also confirmed by measurement of post-variations.

| Start | \ | \ | \ | DEFLECTION UNDER 2 BAR LOAD | | | | | | |
|---|---|---|---|---|---|---|---|---|---|---|
|  | 0.5% | 1% | 2% | 3% | 4% | 5% | 10% | 15% | 20% | 25% |
| 1195° | 1220 | 1230 | 1245 | 1275 | 1290 | 1295 | 1305 | 1315 | 1315 | 1315 |

| AT 20° 7 days | | MECHANICAL STRENGTHS After 6 hrs at 800° | | After 6h at 1100° | |
|---|---|---|---|---|---|
| Bending | Compression | Bending | Compression | Bending | Compression |
| 101 | 948 | 63 | 515 | 33 | 236 |

| Pyroscopic strength of the concrete | 1,380° |
|---|---|
| Dimensional post-variations : |  |
| after 6 hrs at 800°: | 0 |
| after 6 hrs at 1100°: | 0 |
| loss of weight after 6 hrs at 800°: | 10.7 % |
| loss of weight after 6 hrs at 1,100°: | 10.9 |

It will be noted that the mechanical strengths, and the start of deflection under load differ hardly at all from the corresponding properties of an aluminous cement fire-clay concrete.

EXAMPLE 6

When the reinforcing bars in reinforced concrete have a much higher expansion coefficient than the surrounding concrete, a rise in temperature may cause the reinforced concrete to burst, by setting up tensile stresses that are above the acceptable limit.

To avoid this, such concrete is hydrated at a temperature of 80°C and then cooled slowly, so as to bring about self-prestressing of the whole unit; this pre-stressing may also be tri-axial.

Stress levels of up to 140 bars may be involved. The steel is placed gradually under tension during cooling, not abruptly as in conventional methods.

EXAMPLE 7

Concrete corresponding to Example 3 is used to make tanks to hold liquefied gases at low temperature, the inner shells of which are of concrete.

This removes the need for hooping, and the problems involved in covering cables in the hooped concrete tanks normally used.

The reinforced concrete is cast at normal temperature, or possibly baked. It is self-prestressed during the cooling brought about by the storing of the liquefied gas.

Where the concrete used has a thermal expansion coefficient of $3.10^{-6}$ m/m/°C, is cast at 20°C and cooled by a liquefied gas at a temperature of − 160°C for instance, the stress on the concrete is 130 bars, for a steel/concrete ratio of 5/100.

This is equivalent to the stress on a heavily hooped concrete.

This application is particularly useful in the case of tanks consisting of an outer heat-insulating shell, an intermediate sealing shell, and an internal prestressed concrete shell (to increase overall solidity), which comes into contact with the cold liquid, and which, where the amount of liquid in the tank varies, may show temperature gradients vertically.

EXAMPLE 8

Refractory concrete is prepared from cordierite granules according to Example 1, mainly spherical, crushed, and from aluminous cements.

The composition by weight is as follows:

|  | Grain-size (mm) | Kg. |
|---|---|---|
| granulate | 2 – 6. | 539 |
|  | 0.2 – 2 | 597 |
|  | 0 – 0.2 | 285 |
| White cement with high alumina content |  | 500 |
| Water |  | 250 lt. |

Physical measurements produce the following results.

| | DEFLECTION UNDER 2 BAR LOAD | | | |
|---|---|---|---|---|
| 0.5 % | 1 % | 2 % | 5 % | 10 % |
| 1270 | 1330 | 1380 | 1390 | 1395 |

| At 20°C 7 days | | MECHANICAL STRENGTHS After 6 hrs at 800°C | | After 6 hrs at 1100°C | |
|---|---|---|---|---|---|
| Bending | Compression | Bending | Compression | Bending | Compression |
| 97 | 690 | 100 | 760 | 55 | 380 |

| | |
|---|---|
| Pyroscopic strength of the concrete | 1,460°C |
| Dimensional post-variations at 1,100°C | 0.18 % |
| Average expansion coefficient | $3.10^{-6}$ |

Naturally, the invention is in no way confined to the examples given above: many variants will be possible for someone skilled in the art, depending on the applications involved and without implying any departure from the spirit of the invention. In particular, it is not necessary for the product to correspond exactly to the stoichiometric requirements laid down in the formula for cordierite, although it is clear that the more they differ from them, the more will the specific properties be affected.

What is claimed is:

1. A process for preparing concrete having a low expansion coefficient which comprises mixing a composition consisting essentially of cordierite granules with a binder selected from the group consisting of portland, aluminous and white cements to obtain the desired product.

2. A process according to claim 1, wherein the cordierite granules are more than about 5 mm in size.

3. A process according to claim 1, wherein the cordierite is granulated in the presence of an expansion agent, and followed by sintering at a temperature between about 1,200° and 1,450°C.

4. A process according to claim 1, wherein the cordierite is prepared from kaolin, magnesite, alumina, bauxite, serpentine, talc and clay.

5. A process according to claim 3, wherein the expansion agent is added to the mixture in proportions ranging from about 3 to 5 percent in weight.

6. A process according to claim 5, wherein the expansion agent is a sulphate selected from the group consisting of Ca, Mg, Na, and Fe sulphates.

7. A process according to claim 5, wherein the expansion agent is a carbonate selected from the group consisting of Li, Ca, Sr and Ba carbonates.

8. A process according to claim 5, wherein the expansion agent is fuel oil.

9. A process according to claim 6, wherein the expansion agent is anhydrous or hydrous calcium sulphate.

10. A process according to claim 1, wherein the granules consist wholly or 30 to 50 percent by weight of cordierite granules more than 5 mm in size and a proportion of fines of the group consisting of sand, cordierite, or any other material that can form an aggregate.

11. A concrete product obtained by the process of claim 1 having a low expansion coefficient and a density of less than 2.1 and the aggregate content consisting wholly or in part of cordierite.

12. A process according to claim 1, wherein the cordierite granules are mixed with sand and a binder selected from the group consisting of Portland cement, aluminous cement, and white cement with a high alumina content, in the presence of water.

* * * * *